(12) United States Patent
Maile et al.

(10) Patent No.: US 9,560,856 B2
(45) Date of Patent: Feb. 7, 2017

(54) FILLING MACHINE AND METHOD FOR FILLING A PASTY MASS

(71) Applicant: ALBERT HANDTMANN MASCHINENFABRIK GMBH & CO. KG, Biberach (DE)

(72) Inventors: Bernd Maile, Oggelshausen (DE); Paul Mantz, Ehingen (DE); Martin Staudenrausch, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 15/099,500

(22) Filed: Apr. 14, 2016

(65) Prior Publication Data
US 2016/0302432 A1   Oct. 20, 2016

(30) Foreign Application Priority Data

Apr. 16, 2015 (EP) ..................... 15163851

(51) Int. Cl.
*A22C 11/00* (2006.01)
*A22C 11/06* (2006.01)
*A23L 1/317* (2006.01)

(52) U.S. Cl.
CPC .............. *A22C 11/06* (2013.01); *A23L 1/3175* (2013.01); *A23V 2002/00* (2013.01)

(58) Field of Classification Search
CPC ..... A22C 11/0245; A22C 11/06; A22C 11/02; A22C 7/00
USPC .......... 452/21–26, 30–32, 35–37, 46–48, 51; 418/15, 24, 314, 71, 127, 128, 255, 257, 418/258, 260
See application file for complete search history.

(56) References Cited

U.S. PATENT DOCUMENTS

| 3,658,446 | A | * | 4/1972 | Jansson | F04C 14/223 418/31 |
| 3,742,556 | A | * | 7/1973 | Beasley | A22C 11/08 452/41 |
| 5,102,314 | A | * | 4/1992 | Staudenrausch | A22C 11/08 418/127 |
| 5,129,316 | A | * | 7/1992 | Calderon | B01F 7/16 366/139 |
| 5,720,603 | A | * | 2/1998 | Miller | A22C 11/08 417/310 |
| 6,309,293 | B1 | | 10/2001 | Zinser et al. | |
| 7,597,612 | B2 | * | 10/2009 | Maile | F16K 1/36 452/30 |
| 7,744,448 | B2 | * | 6/2010 | Maile | A22C 11/0245 452/31 |

(Continued)

FOREIGN PATENT DOCUMENTS

DE   19916582 A1   10/2000
DE   19925417 C1   10/2000

(Continued)

*Primary Examiner* — Richard Price, Jr.
(74) *Attorney, Agent, or Firm* — Alleman Hall McCoy Russell & Tuttle LLP

(57) ABSTRACT

The invention relates to a filling machine and a method for filling a pasty mass, in particular for the production of sausages, with a vane cell pump for conveying the paste mass, a vacuum pump for generating negative pressure in the vane cell pump, where the housing of the vane cell pump comprises an evacuation opening via which the vacuum pump can evacuate the vane cells. The evacuation opening is formed in the cover of the vane cell pump.

16 Claims, 13 Drawing Sheets

(56) References Cited

U.S. PATENT DOCUMENTS 8,678,885 B2 * 3/2014 Staudenrausch ....... A22C 11/08
452/31

FOREIGN PATENT DOCUMENTS

| EP | 1044612 A1 | 10/2000 |
| EP | 1837524 A1 | 9/2007 |
| EP | 2525098 A1 | 11/2012 |
| EP | 2628391 A1 | 8/2013 |

* cited by examiner

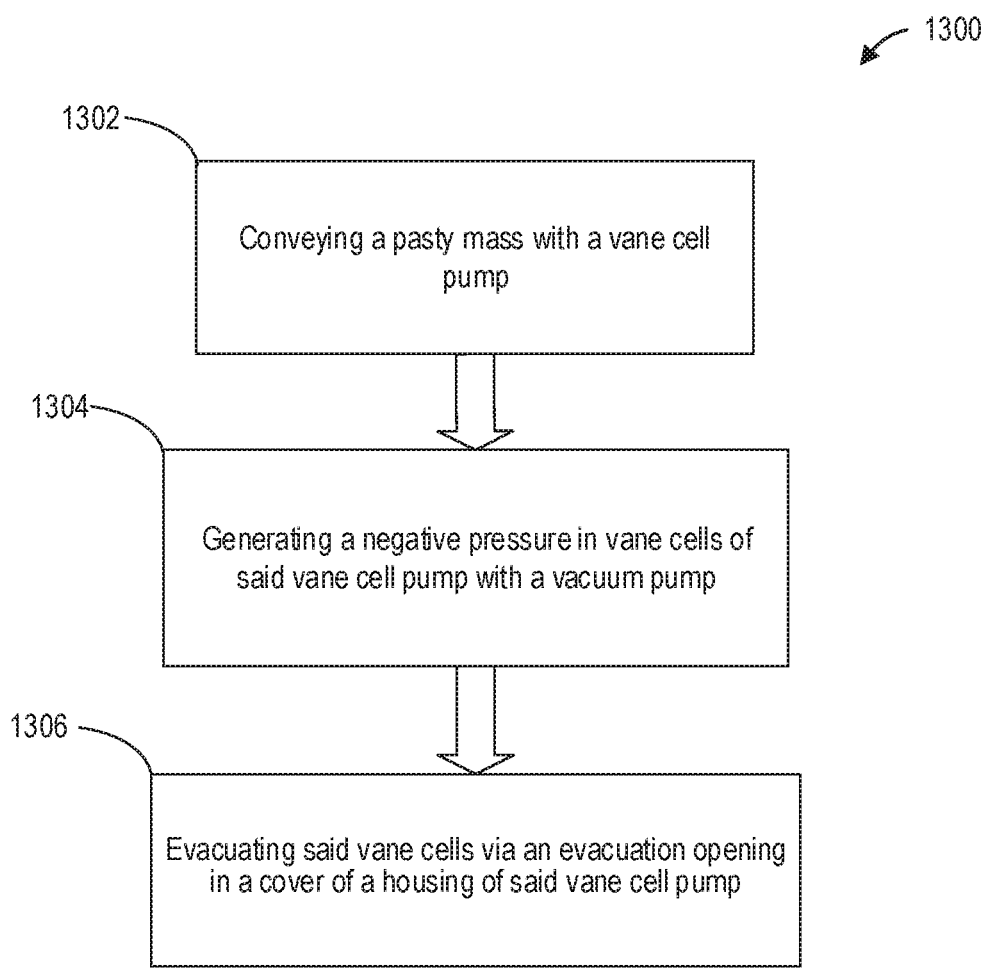

FILLING MACHINE AND METHOD FOR FILLING A PASTY MASS

CROSS REFERENCE TO RELATED APPLICATIONS

The present application claims priority to European Patent Application No. 15 163 851.7, entitled "FILLING MACHINE AND METHOD FOR FILLING A PASTY MASS," filed Apr. 16, 2015, the entire contents of which are hereby incorporated by reference for all purposes.

TECHNICAL FIELD

The invention relates to a filling machine and a method for filling a pasty mass.

BACKGROUND AND SUMMARY

When producing sausages, a pasty mass is by use of a filling machine pushed via a hopper and a vane cell pump into a stuffing tube, where the pasty mass is then extruded, for example, from the stuffing tube into a sausage casing. In order to preserve food, in particular pasty mass such as sausage meat, as much air as possible is removed from these masses. A vacuum pump is for this purpose connected to the vane cell pump for the paste mass in order to evacuate the vanes of the vane cell pump. Respective filling machines or vane cell pumps are shown, for example, in EP 1 044 612 and EP 1 837 524. FIG. 11 shows a cross-sectional view through a respective vane cell pump. It is there evident that an evacuation opening is provided in the side wall of the vane cell pump and leads via a channel to the vacuum pump.

It happens when evacuating the delivery cells, however, that parts of the pasty mass are dragged along in the direction of the vacuum pump. A collection container is provided for this reason between the delivery pump and the vacuum pump to collect entrained pasty mass, dirt and water. Also when cleaning the vane cell pump, parts of the conveyed mass, water, and dirt enter into this collection container. The vacuum pump and the air filter disposed upstream thereof can thereby be protected.

The collection container must be emptied and cleaned at regular intervals to prevent the spread of pathogenic organisms and unpleasant odors. It must additionally be prevented that the mass collected in the collection container exceeds a certain filling level, i.e. it must be prevented that the vacuum connection from the delivery pump to the vacuum pump is interrupted (for example, when the mass collected already completely fills the collection container and already rises into the vacuum lines so that the vacuum lines become clogged). Otherwise, there is an undesirable increase in pressure in the delivery cells. In addition, the vacuum channel between the conveying mechanism and the collection device must be cleaned regularly.

It is with conventional filling machines in the ready-to-operate state not possible to inspect the vacuum channel in order to decide at the right point in time whether the vacuum channel needs cleaning.

Accessibility to the vacuum channel was previously only possible from the upper side of the open conveying mechanism. This means that if e.g. a clogged vacuum channel needs to be cleaned, the hopper of the filling machine must first be emptied in order to then pivot upwardly the pivot casing to which the hopper is attached and at the lower end of which the cover of the vane cell pump is located. Any inspection of the vacuum channel is hardly feasible, and monitoring the collection container is cumbersome since, for example, the collection container is to be inspected behind a flap, while the vacuum must be switched off for inspection. Even with the vane cell pump being open, the vacuum channel and/or the collection container cannot be adequately inspected.

The opening for evacuation of the vane is in conventional filling machines located in the side wall of the pump housing. Due to a radial sealing gap between the vane and the vane cell pump housing, pasty mass is dragged along by the rotor and the pump vanes into the evacuation area, i.e. the region in which the evacuation opening is disposed. This dragged along material then deposits on the lateral pump wall in the evacuation region, in particular at the edges of the evacuation opening, and over time clogs the evacuation opening in the pump wall. Moreover, it is possible that the pasty mass is then dragged along also into the vacuum channel and the collection container. The channel can become clogged, so that both evacuation as well as the portioning accuracy deteriorates.

Proceeding from there, the present invention is based on the object to provide a filling machine and a method for filling which enable permanently safe and reliable evacuation of the vane cell chambers and hence of the product.

According to the present invention, the evacuation opening is now located in the pump cover, i.e. suction is effected upwardly and the vane cells are vented upwardly, respectively, so that the suction is effected through the pump cover. The evacuation opening is disposed in the vacuum region and opens into the vane cell chamber. The vane cells move past beneath the evacuation opening. Whenever a pump vane passes by beneath the evacuation opening, the pasty mass, should something have nevertheless been deposited at the pump cover, is entrained by the pump vanes and the bore hole is thereby kept clear. Keeping the evacuation opening clear at the pump cover is possible for the reason that the gap between the pump vane and the pump cover is considerably smaller than the radial gap between the pump wall and pump vane. Clogging of the evacuation opening by pasty mass dragged along is thereby prevented. Moreover, the amount of mass that is dragged along through a vacuum line from the evacuation opening in the direction toward the vacuum pump can be significantly reduced, so that the cleaning effort necessary can be significantly reduced. Adequate evacuation of the vane cells can thereby be permanently ensured, so that adequate and accurate evacuation of the pasty mass can also be ensured at a high portioning accuracy, i.e. process reliability in production can be ensured over a longer period. Any additional components such as wiper plates etc. are not necessary. Negative pressure can according to the invention be generated in the vane cells regardless of fouling and deposits on the side walls of the vane cell pump. Any mass adhering to the cover can be easily wiped from the pump vane so that the bore hole is cleared. Since the opening is located at the top, no fouling can due to gravity drop into the opening. In addition, the evacuation opening according to the invention also enables a separate access way from the top, for example, from the top through the cover of the vane cell pump or through a pivot housing and the cover, without the vane cell pump needing to be opened.

The evacuation opening is connected via a vacuum line to the vacuum pump. This means that a vacuum-tight line is run from the evacuation opening to the vacuum pump. Different line sections are for this connected in a pressure-tight manner or sealed to each other.

The vacuum line comprises e.g. a channel section in the cover and a recess. The recess can be formed in the cover and/or in the pivot housing on which the cover is arranged. The recess can have a larger cross-sectional area than the channel section. An inspection opening is disposed in the upper region of the recess through which the evacuation opening and/or the channel section communicating with the evacuation opening can be inspected, in one example. The degree of fouling of the evacuation opening or the channel section can therewith be inspected in a simple manner from above without the cover of the filling machine needing to be opened.

The vacuum line can also comprise a channel that is with one end in communication with a collection container for pasty mass that is dragged along. Its other end can open into the recess, in particular in its lower region. The vane cell pump is thereby e.g. via the evacuation opening, the channel section, the recess and the further channel in communication with the collection container.

This arrangement can be configured such that the channel and/or of the collection container can be inspected through the inspection opening when the cover is closed. The inspection opening is there facing upwardly so that an operator can inspect the degree of fouling from above. The operator can advantageously via the inspection opening inspect both the channel to the collection container and/or the collection container as well as also the evacuation opening and/or the channel section to the evacuation opening. The degree of fouling can thus be determined in a simple manner. Moreover, the inspection opening also provides access to the respective sections of the vacuum line for cleaning the respective sections without complex measures being necessary. This embodiment therefore provides the advantage that the vane cell pump does not need to be opened when inspecting for fouling, so that, for example, a cover of the vane cell pump together with a pivot housing and a hopper disposed thereon do not need to be pivoted away. The hopper also does not need to be emptied.

According to one embodiment of the present invention, the inspection opening is disposed, for example, in a cover of the vane cell pump. This is the case where the pivot housing on which the hopper is disposed and on the underside of which the cover is attached is in certain types of machines smaller than the cover such that the cover protrudes beyond the pivot housing. But it is also possible that the inspection opening is located in the pivot housing and that a respective recess is then provided at least in the pivot housing into which both the channel to the collection container as well as the channel section to the evacuation opening can open. In order to ensure free visibility into the collection container and into the evacuation opening, there must be at least one respective straight optical path connecting the inspection opening with the inlet to the collection container or to the evacuation opening.

The inspection opening is advantageously formed to be closeable. The inspection opening can by way of a closure element be closed and may also be reopened. The closure element is in one example configured as an axially movable piston. The closure element can also comprise an inspection glass so that the operator can inspect the channel and/or the collection container or the channel section and/or the evacuation opening also during an ongoing process through the inspection glass and immediately become aware of excessive fouling.

The piston is advantageously arranged to be axially movable in the recess such that in a lower position, it closes either the channel which is in communication with the collection container and/or the further channel section which leads to the evacuation opening, i.e. separates the channel from the further channel section.

The axially movable piston can also be completely removed from the recess, so that, for example, the channel can be better inspected and cleaned. It is also possible to move the axially movable piston so far upwards that the channel and the further channel section can be vented. In the inserted state, the piston seals the recess from the exterior. The piston can be axially moved manually, for example, by use of a thread, a bayonet closure, a toggle lever, etc.

However, it is also possible to provide a driven closure cylinder which separates the vacuum connection between the vacuum pump and the vane cell pump, where the closure cylinder can be retracted—when viewed from a position in the vertical direction—in one example, below the cover into the vacuum line, i.e. into the channel.

According to another embodiment, at least one sensor is integrated in the closure element and/or into the cover of the vane cell pump, in particular for measuring the temperature and/or the pressure and/or the density and/or of the air content. An optical sensor can also be integrated in the closure element which optically detects, for example, the channel and/or the collection container and/or the channel section and/or the evacuation opening and represents it on a display. The sensor signals can be supplied to the control system of the filling machine and evaluated there, and used for automated process control and optimization.

The vacuum channel is sealed in a region between the cover and the pivot housing. This means that either a sealing device is provided between the cover and the pivot housing, or that, for example, a tube is run in a pressure-tight manner from the evacuation opening through the cover and the pivot housing.

The sensor is one example a pressure sensor and may be arranged in the closure element. It can comprise a display element that is movable in dependence of the pressure in the vane cell chamber. This means that the display element is in the vertical direction moved upwardly in dependence of the pressure out from the closure element and also downwardly into the closure element, so that an operator can monitor the pressure condition in the vane cell chamber in a simple manner. The display element is there in particular configured as a slide that is adjustable in height. The display element is advantageously disposed in the upper region of a channel in the closure element and is held by a spring in a certain position, where the display element with decreasing pressure in the vane cell pump moves downwardly against the spring force. The display element can with increased pressure extend above the surface of the closure element, so that the operator can easily recognize the position of the display element. The slide position can be detected by sensors and the signal supplied to the controller and evaluated by the latter.

In the method according to the invention for filling a pasty mass, the empty vane cells returning to the inlet of the vane cell pump are evacuated via an evacuation opening in the cover of the housing of the vane cell pump.

According to one embodiment, a groove-shaped depression in the vacuum region is formed in the flat surface of the cover facing the pump interior and the evacuation opening is arranged outside the depression in the vacuum region.

BRIEF DESCRIPTION OF THE FIGURES

The present invention shall be explained below in more detail with reference to the following figures.

FIG. 13 is a flow chart of an example method for filling a pasty mass according to the present invention.

DETAILED DESCRIPTION

FIGS. 1-12 show the relative positioning of various components of the filling machine. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
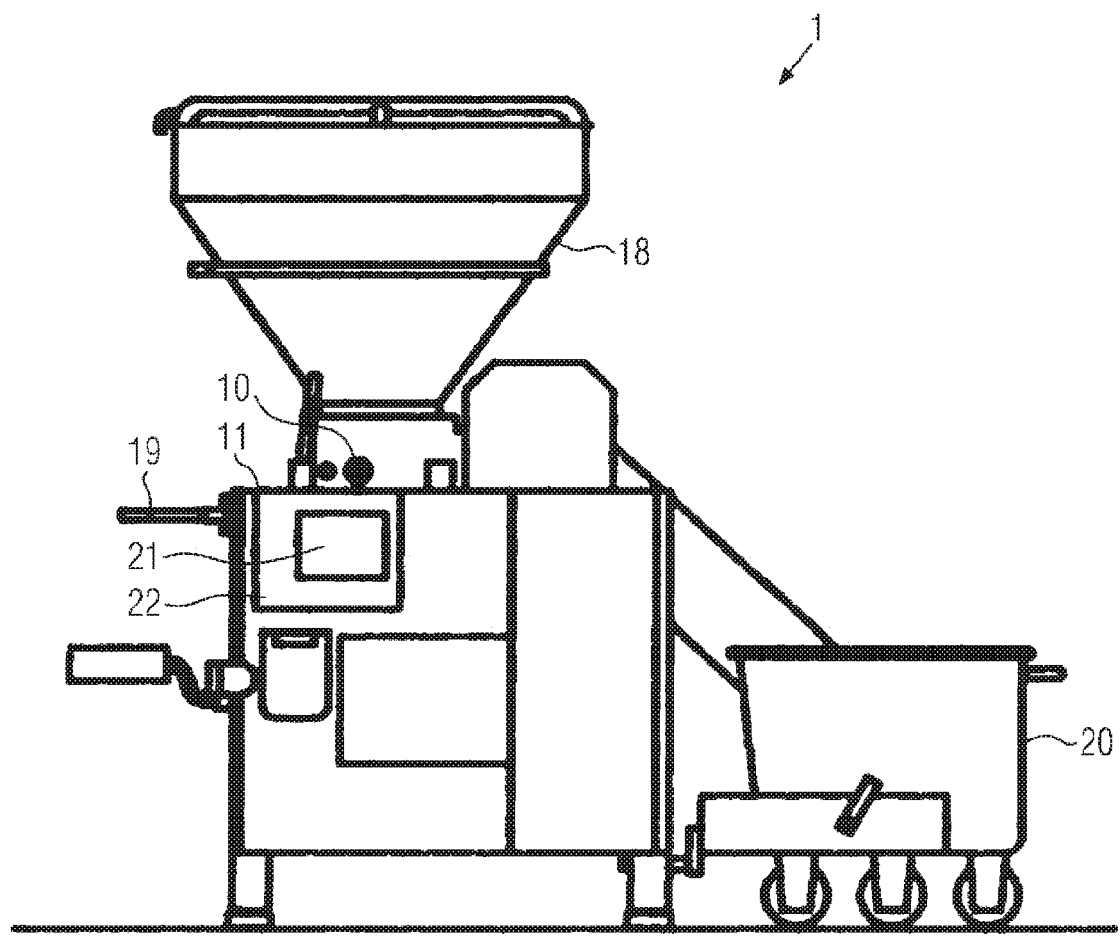
FIG. 1 very schematically shows a side view of a filling machine according to one embodiment of the present invention.
Figure 2:
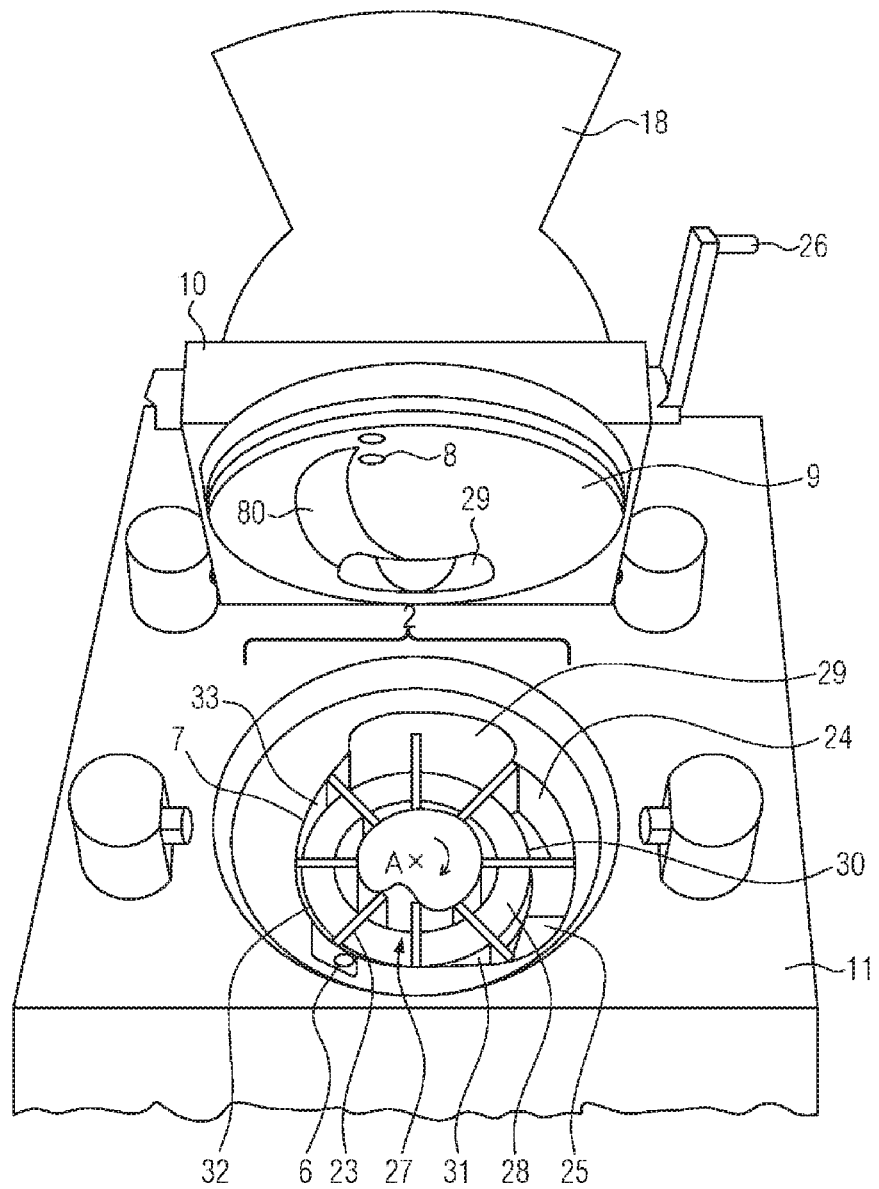
FIG. 2 schematically shows a vane cell pump in a perspective view.

FIG. 1 very schematically shows a side view of a filling machine according to the present invention. Filling machine 1 comprises a hopper 18 for receiving a pasty mass. This hopper 18, as is apparent also from FIG. 2, is arranged on a pivot housing 10 such that the pivot housing including a cover 9 of a vane cell pump 2 can be pivoted for opening vane cell pump 2. Vane cell pump 2 is disposed below the hopper. Filling machine 1 further comprises a stuffing tube 19. The pasty mass is pushed through vane cell pump 2 into stuffing tube 19 and then extruded in a known manner, for example, into sausage casings. The filling machine further comprises a controller 22 and a display 21. In this embodiment, the filling machine further comprises a lifting device with a sausage meat carriage 20 with which the pasty mass can be raised and dumped into hopper 18. The filling machine comprises a machine housing 11 in which vane cell pump 2 is arranged.

FIG. 2 shows the structure of vane cell pump 2 in greater detail. The vane cell pump comprises a lateral housing wall 24 and a base plate 25 and can with cover 9 be closed to the top. In the position illustrated in FIG. 2, the vane cell pump is open, for example, for cleaning purposes, so that the interior of the conveying mechanism can be seen.

For closing, the cover, being pivotable about an axis of rotation attached to the machine housing, can by use of lever 26 be pivoted downwardly to the operating position. Provided in interior 27 is an eccentrically disposed rotor 28 that can be made to rotate. Located in rotor 28 are radially slidable vanes 23 which with housing wall 24 of the vane cell pump, the base and cover 9, and the outer surface of rotor 28 form vane cells and cooperate in a sealing manner. The vane cell pump further comprises a sausage meat inlet 29 and a sausage meat outlet 31. Sausage meat inlet 29 is in the direction of rotation A followed by a pressure region 30 in which vane cells 7 become smaller in volume. This pressure region opens into sausage meat outlet 31 which leads to a discharge pipe, not shown. Sausage meat outlet 31 is in the direction of rotation A followed by a sealing region 32 in which the outer surface of rotor 28 directly contacts the inner wall of the pump housing.

The sealing region is followed by the vacuum or suction region 33 which reaches all the way to sausage meat inlet 29. A negative pressure in vane cell chambers 7 is in this vacuum or suction region generated which facilitates filling in the pasty mass and serves withdrawing as much air as possible from the pasty mass. For evacuating vane cells 7 in this vacuum region 33 (see also FIG. 11), an evacuation opening 8 is provided via which vane cells 7 can with the aid of a vacuum pump 3, as for example shown in FIG. 3, be evacuated, this means e.g. the pressure in the vane cells is reduced.

In the embodiment shown in FIG. 2, evacuation opening 8 is arranged in the cover of vane cell pump 2. A respective bore hole can for this purpose be provided in cover 9. The cross-sectional area of the evacuation opening is typically in a range from 1 cm$^2$-30 cm$^2$. The evacuation opening opens into the vane cell chamber. The vane cells move past beneath the evacuation opening.

A groove-shaped depression 80 can be provided in the downwardly facing surface of cover 9.

When the cover is closed, depression 80 extends above the vane cells in the vacuum region such that a gap is formed between the upper sides of the vanes and the downwardly facing flat surface of cover 9. Pressure equalization can thereby be performed between the covered adjacent vane cells. It is essential that evacuation opening 8 is in such an embodiment located outside the groove-shaped depression in the downwardly facing flat surface of cover 9 in the suction or vacuum region, respectively.

Whenever a pump vane passes by beneath the evacuation opening, the pasty mass, should there have nevertheless been some deposit at the pump cover, is entrained by the pump vanes and the bore hole is thereby kept clear. Keeping the evacuation opening clear at the pump cover is possible for the reason that the gap between the pump vane and the pump cover is considerably smaller than the radial gap between the pump wall and the pump vane. Clogging of the evacuation opening by pasty mass that is dragged along is hereby prevented. Moreover, the amount of mass that is dragged through a vacuum line from the evacuation opening in the direction toward the vacuum pump can be significantly reduced, so that the cleaning effort necessary can be significantly reduced. Adequate evacuation of the vane cells can thereby be permanently ensured, so that adequate and accurate evacuation of the pasty mass can be ensured at high portioning accuracy. Any additional components such as wiper plates etc. are not necessary. Negative pressure can according to the invention be generated in the vane cells regardless of fouling and deposits on the side walls of the vane cell pump. Mass adhering to the cover can be easily wiped from the pump vane so that the bore hole is cleared. Since the opening is located at the top, no fouling can due to gravity drop into the opening. In addition, the evacuation opening according to the invention also enables a separate access way from the top, for example, from the top through the cover of the vane cell pump or through a pivot housing and the cover, without the vane cell pump needing to be opened. The evacuation opening also allows for lateral access.

Figure 12:
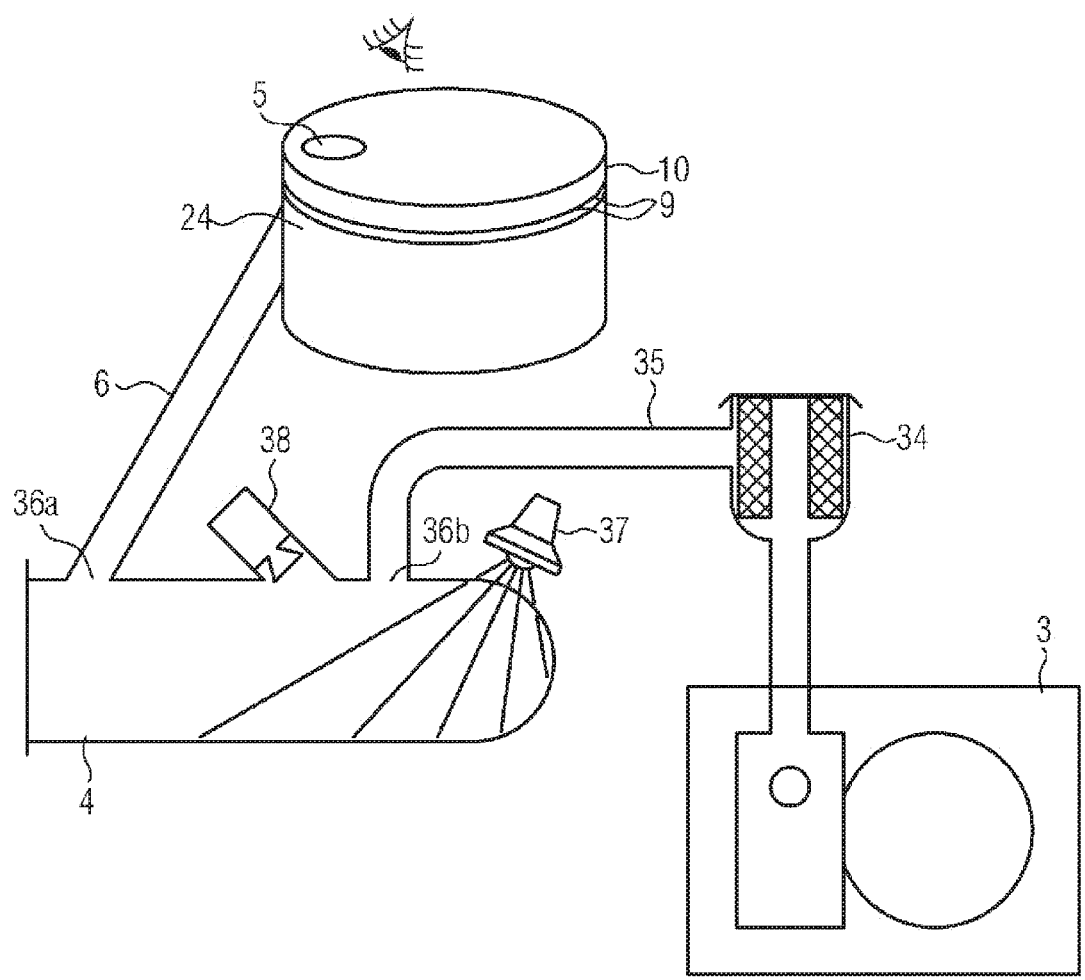
FIG. 12 very schematically shows an embodiment of the present invention.

In the embodiment shown in FIG. 12, the vane cell pump is shown only very schematically with the cover being closed. A channel 6 is in communication with evacuation opening 8—not shown—and opens into a collection container 4 for pasty mass that is dragged along. Dragged along pasty mass, dirt, and water can be collected in collection container 4. Also when cleaning the vane cell pump, parts of the conveyed mass enter into this collection container. Vacuum pump 3 and an optionally provided air filter 34, which is connected via a line 35 to collection container 4, can be effectively protected.

The filling level in collection container 4 may not rise too high such that openings 36a and 36b to channel 6 or to line 35 to the air filter are clogged, as no vacuum can be otherwise be generated in vane cells 7. Moreover, channel 6 may also not severely foul or clog, so as to ensure that sufficient vacuum is generated. Inspection of the fouling of channel 6 and collection container 4 was previously possible only when the vacuum was switched off by opening a flap that seals off the collection container from the exterior.

An inspection opening 5 is now according to one embodiment of the present invention provided which is via a channel 6 in communication with collection container 4 for inspecting the channel and/or the collection container and/or evacuation opening 8 and/or the channel section adjoining the evacuation opening. As is demonstrated by the eye in FIG. 12, the interior of channel 6 can be inspected through inspection opening 5, where the visibility is given through the channel all the way to collection container 4. It can therefore be recognized in a simple manner whether any fouling in channel 6 is given, and whether channel 6 is clogged, or whether collection container 4 is too full.

In order to ensure visibility, the channel should branch off substantially straight from side wall 24 of vane cell pump 2, in particular at less than an angle of 0° to 45°, in particular 0°-15°, to the vertical longitudinal axis of the filling machine.

Figure 10:
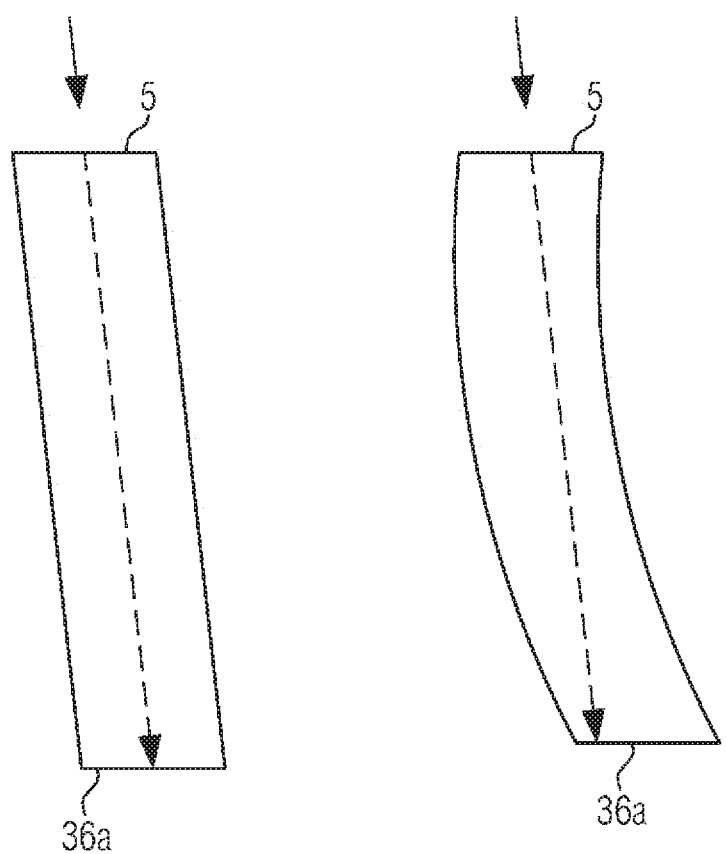
FIG. 10 shows the course of the channel between the collection container and the inspection opening.
Figure 11:
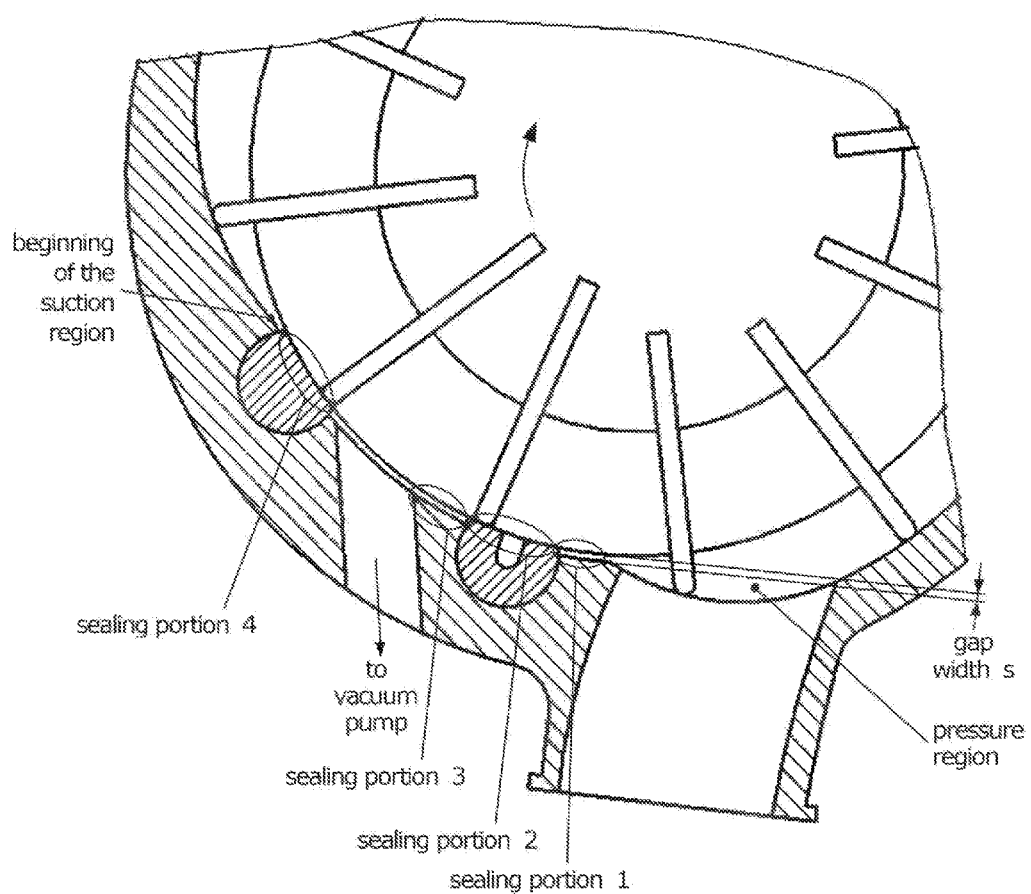
FIG. 11 shows a partial cross-sectional view through a vane cell pump according to prior art.

"Substantially straight" is in this application to mean that the channel is either straight or the curvature or deviation from a straight course of the channel is so small that inlet 36a of the collection container can at least partially be recognized from inspection opening 5, i.e. that there is at least one straight optical path connecting the inspection opening with inlet 36a to the collection container, as is evident in particular from FIG. 10. In order to also be able to look from the inspection opening to the evacuation opening, there must here as well be at least one straight optical path connecting the inspection opening 5 with the evacuation opening. The operator can therefore easily see through channel 6 up to the collection container and also up to the evacuation opening.

It is particularly advantageous to have channel 6 be formed at least in sections from transparent material, e.g. as a transparent hose and/or the collecting container is formed at least in sections from transparent material such that light can shine from the outside through the material. At least one illumination device 37, e.g. in the form of an LED lamp can for this purpose illuminate channel 6 and/or collection container 4 from the outside. If channel 6 and/or collection container 4 are illuminated from the outside, then any fouling can be particularly well detected and recognized. If, for example, channel 6 is clogged, then a dark spot appears. A camera 38 can additionally be disposed (for example in a recess or behind a pane outside of the collection container in a position above the maximum filling level in collection container 4) to capture the interior of collection container 4 and display it, for example, on a display, e.g. display 21. This enables an additional monitoring option. The illumination device is for example an LED light.

The following embodiments essentially correspond to the embodiment shown in FIG. 12, except that an additional pivot housing 10 is shown, where the inspection opening here as well is located outside the vane cell pump and is facing outwardly, in one example, upwardly.

Figure 3:
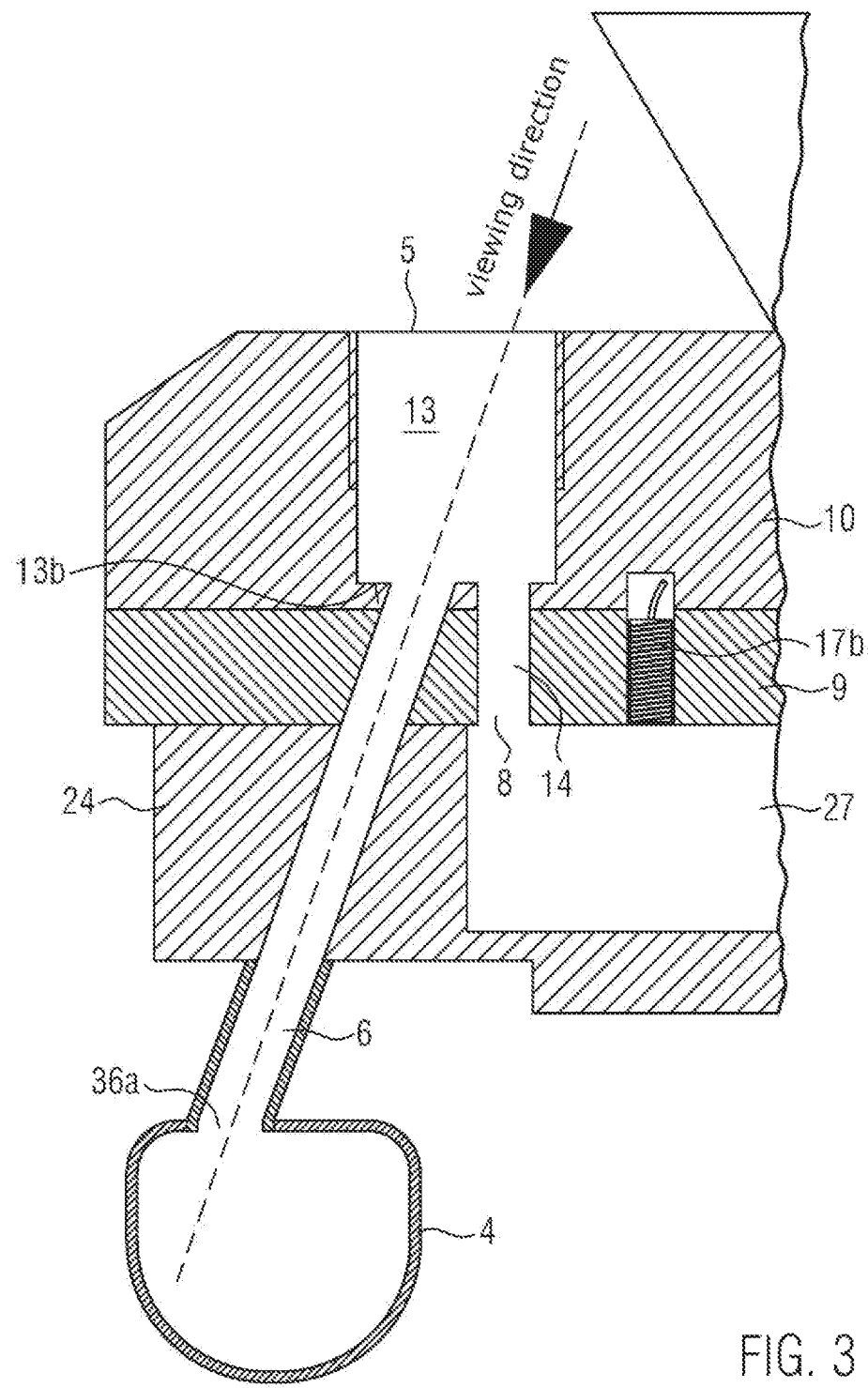
FIG. 3 very schematically shows a sectional view through a part of a filling machine according to one embodiment of the present invention.

FIG. 3 shows a corresponding partial longitudinal sectional view of a filling machine according to one embodiment which substantially corresponds to the embodiment shown in FIG. 2. 27 schematically indicates the chamber or the interior of the vane cell pump which is there closed by cover 9. Pivot housing 10 is arranged about the cover. Upwardly facing inspection opening 5 is there provided in pivot housing 10. Inspection opening 5 is there provided in the upper region of a recess 13 formed in pivot housing 10. Recess 13 could also extend into cover 9. Channel 6 there extends from the water separator through housing wall 24 of the vane cell pump, through cover 9, and opens into lower region 13b of recess 13. Recess 13 can be formed, for example, as a hollow cylinder, but is not restricted to this shape. It would also be possible for embodiments without the pivot housing to form recess 13 in cover 9 and have the inspection opening be located in the upper region of recess 13 in the cover. This applies to all embodiments described.

Evacuation opening 8 is there not provided in side wall 24, but in cover 9. A further channel section 14 extends from evacuation opening 8 to recess 13 and also opens into the latter's lower region. According to the present invention, evacuation opening 8 is now located in pump cover 9, i.e. as already explained in connection with FIG. 2, suction is effected upwardly out from the vane cell pump through pump cover 9, and the vane cells are vented toward the top. Channel 6 is therefore via recess 13 and section 14 via evacuation opening 8 in communication with the vane cell pump, i.e. to vane cell 7 running by. As can be seen by the arrow in FIG. 3 indicating the viewing direction, the interior of channel 6 and also collection container 4 can be inspected via inspection opening 5. The operator can therefore inspect the degree of fouling in a simple manner from above, i.e. from a position above cover 9 and above pivot housing 10, without cover 9 and pivot housing 10 needing to be flipped open. Cleaning channel 6 is also possible—for example with a brush and/or liquid detergent, without having to open cover 9 and pivot housing 10, so that it is also not necessary to empty the hopper for this. Evacuation opening 8 and channel section 14 are advantageously arranged such that this region can as well be inspected through inspection opening 5 without the need for opening the vane cell pump. It would also be possible that channel 6 and/or channel section 14 do not open into the lower region, i.e. the base, but laterally into the recess at an angle such that a view is possible from the inspection opening into channel 6 up to the collection container and/or into channel section 14 up to the evacuation opening.

Inspection opening 5 is advantageously formed to be closeable. The inspection opening can be closed by way of a closure element 12, as is apparent in particular from FIG. 4, which describes a further embodiment of the present invention that corresponds substantially to the embodiment shown in FIG. 3 The closure element is there embodied as an axially movable piston 12. The axially movable closure piston is configured as a vacuum closure and there closes inspection opening 5. The axially movable piston 12 can be moved, for example, up and down manually in the recess, in particular by a thread.

Figure 4:
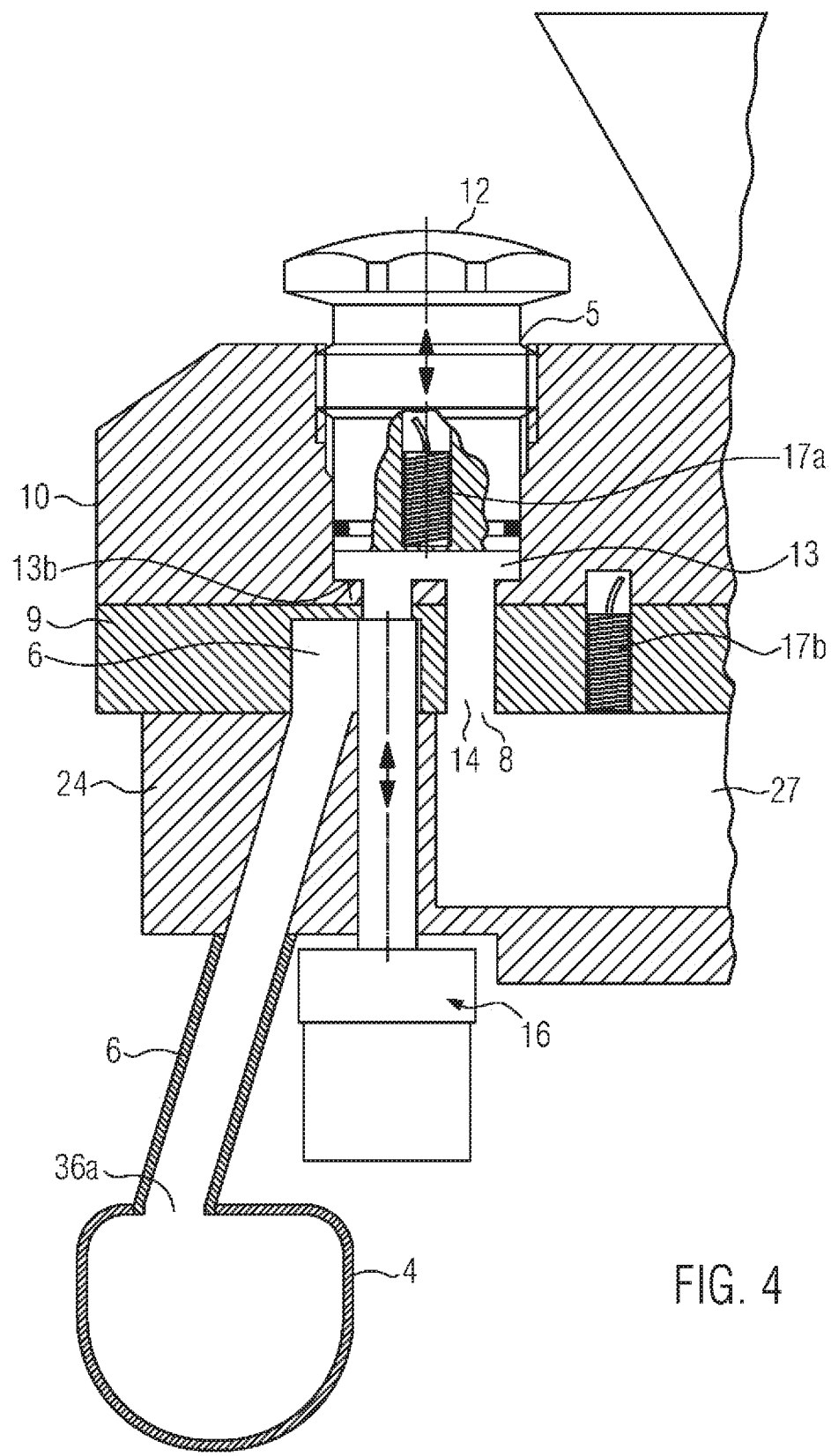
FIG. 4 shows a longitudinal sectional view through a part of a filling machine according to a further embodiment of the present invention in the evacuation position.

When piston 12 shown in FIG. 4 is moved still further downwardly to its lowermost position, it can close either channel 6 and/or further channel section 14, both of which open into recess 13, i.e., separate channel 6 from further channel section 14. In addition, a closure cylinder 16 is there provided which separates channel 6 from evacuation opening 8 such that there is no longer any vacuum connection between the vacuum pump and the conveying mechanism, or no longer any connection between channel 6 and possibly open inspection opening 5. Closure cylinder 16 is there located in the lower region of cover 9. A respective closure, however, can also be effected from the top or from the side. Actuation of the closure cylinder can be effected electrically, pneumatically or hydraulically. It is only essential that the closure cylinder closes the vacuum line, presently channel 6.

At least one sensor 17 can be provided in the closure element, presently closure piston 12, for measuring the pressure or the temperature or the air content or the density of the pasty mass. Such a sensor, or such sensors 17b, can additionally or alternatively also be disposed in pump cover 9 or in the side wall of the vane cell pump in the vacuum or suction region of the vane cell pump. The respective sensor signals can be supplied to controller 22 of the filling machine and evaluated and used there for automated process control and optimization.

A respective pressure sensor 17a, which can be easy to disassemble and clean, can effectively monitor the operation of the evacuation system between vacuum pump 3 and the closure piston. Sensor 17b is able to monitor the actual pressure conditions in the vacuum region of the vane cell pump. When both sensors 17a, 17b are used, providing detailed information about potential errors (e.g. closure of vacuum channels) in the evacuation system is possible.

If, for example, the pressure measured by sensor 17a differs from a setpoint value, then this is also an indication that fouling has occurred and cleaning is necessary.

Figure 5:
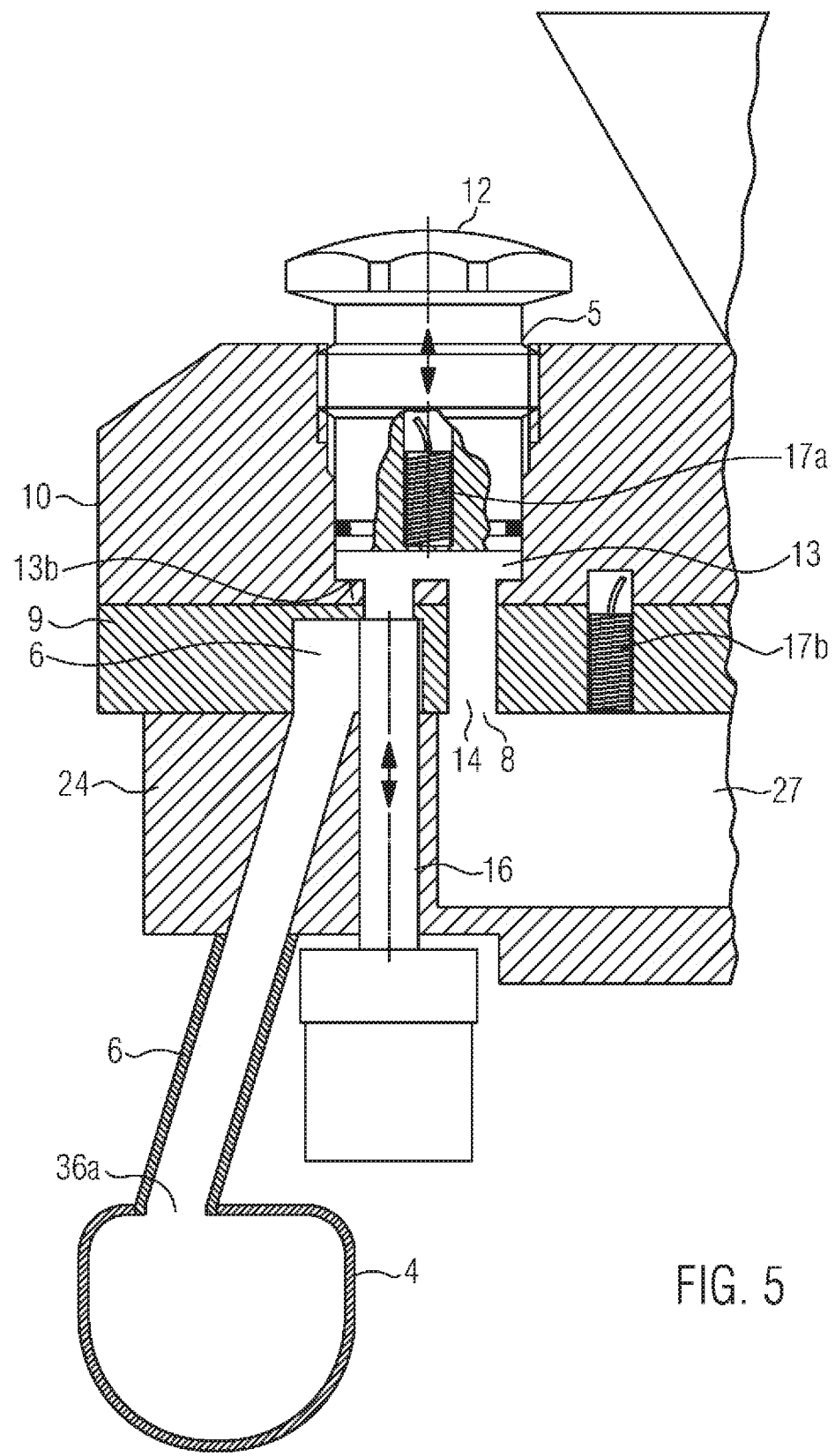
FIG. 5 shows the embodiment shown in FIG. 4 with the closure cylinder being closed.

FIG. 5 shows the embodiment shown in FIG. 4 with the closure cylinder being closed. Closure cylinder 16 is there located in its upper position so that the vacuum connection between the collection container and the inspection opening or the vane cell pump, respectively, is closed.

Figure 6:
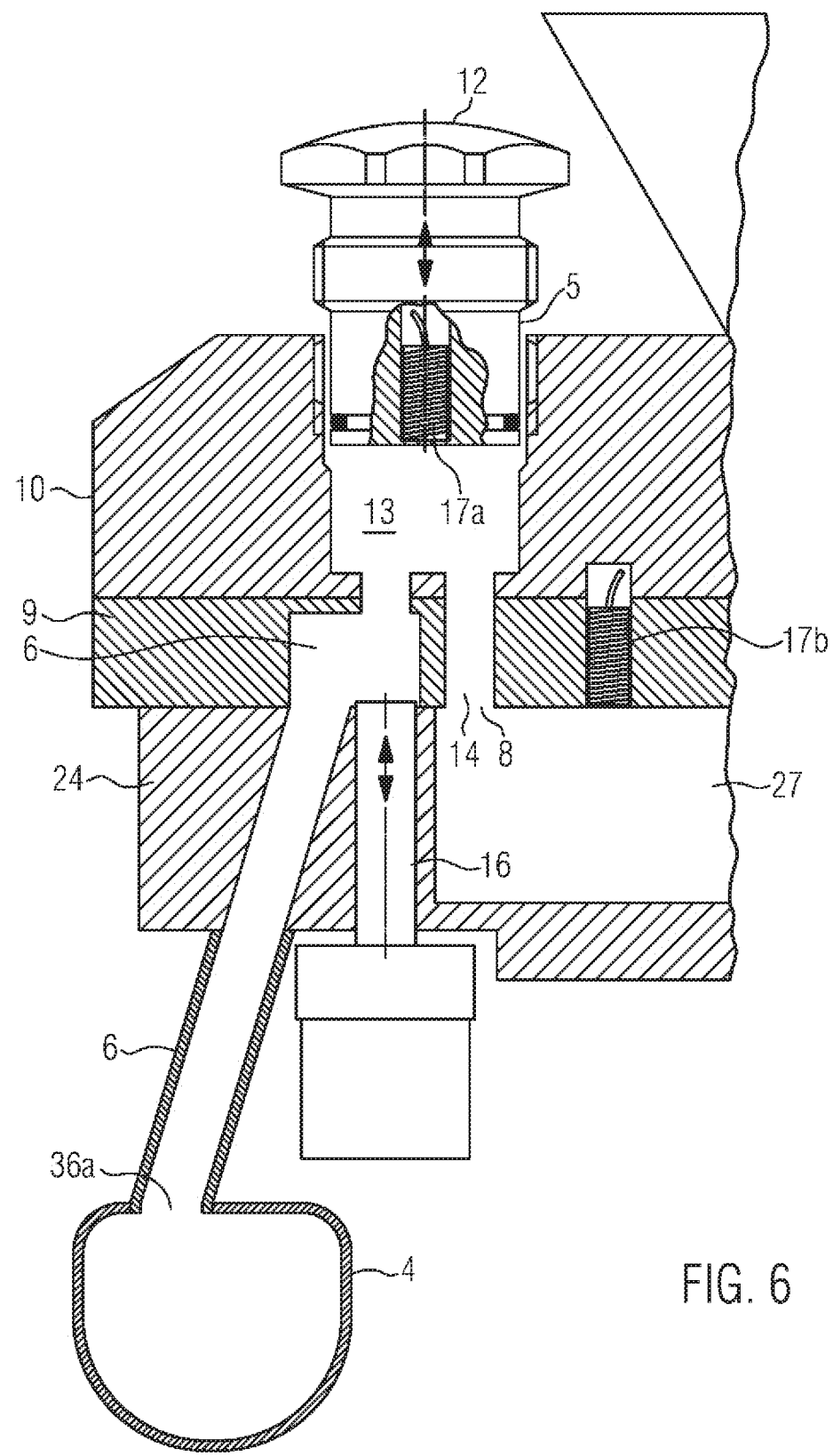
FIG. 6 shows the embodiment shown in FIGS. 4 and 5 with the closure being open in the ventilation position.

FIG. 6 shows the embodiments shown in FIGS. 4 and 5, where closure piston 12 was there moved upwardly and is located in a ventilation position. The closure cylinder there opens the path from channel 6 in the direction of inspection opening 5.

Figure 7:
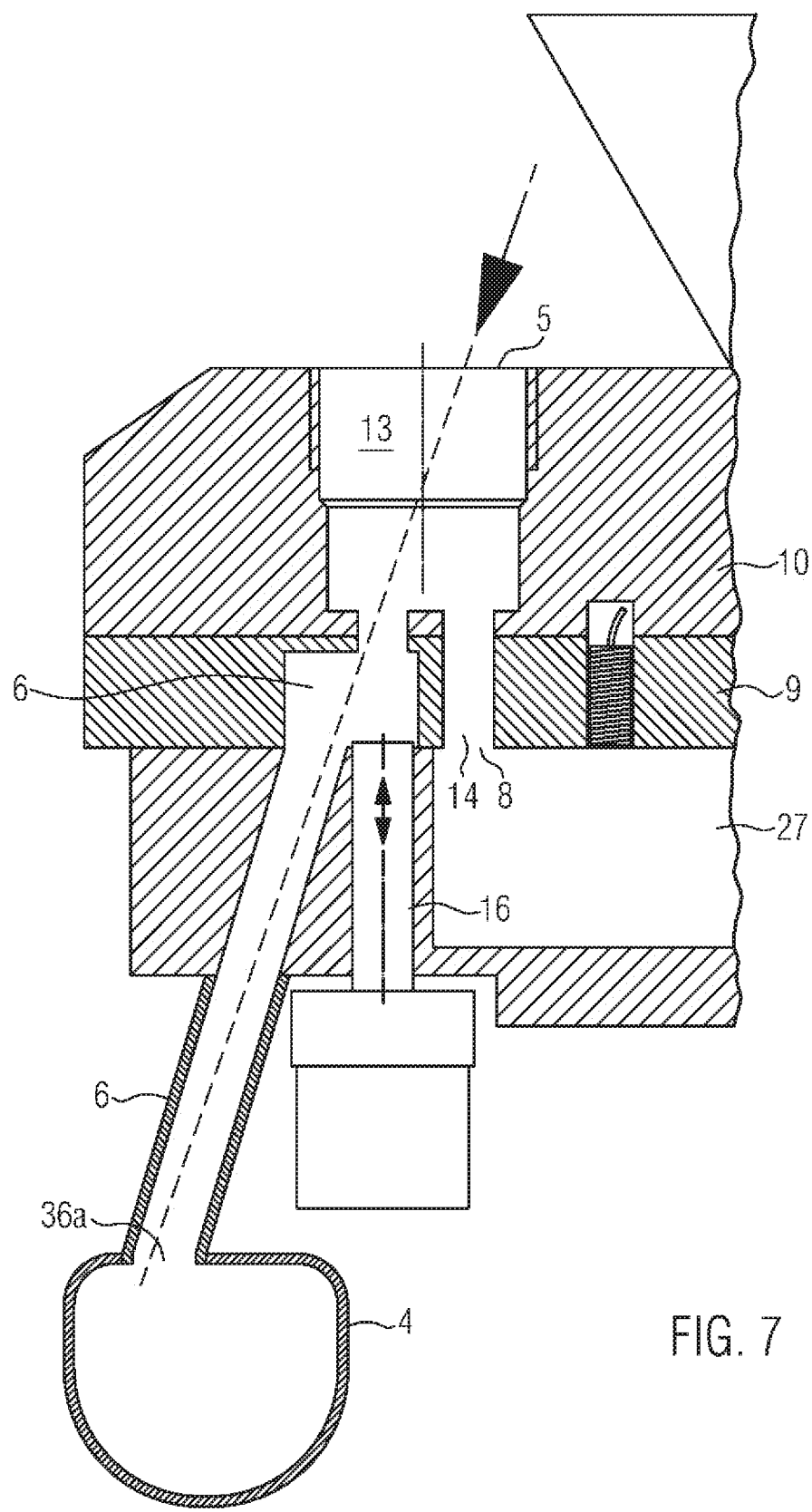
FIG. 7 shows the embodiments shown in FIGS. 4 to 6 with the closure element being removed.

FIG. 7 corresponds to the embodiment shown in FIGS. 4 to 6, where closure piston 12 has there been removed for inspection and cleaning. As is clear from FIG. 7, clear visibility from above from inspection opening 5 through channel 6 to collection container 4 and evacuation opening 8 is there given as well. This means that there is an optical path connecting inspection opening 5 with inlet 36a to collection container 4 or with evacuation opening 8. The operator can therefore easily recognize whether channel 6 is fouled or clogged and whether collection container 4 is too full. The operator can also recognize whether evacuation opening 8 must be cleaned. Cleaning can be done through the open inspection opening.

Figure 8:
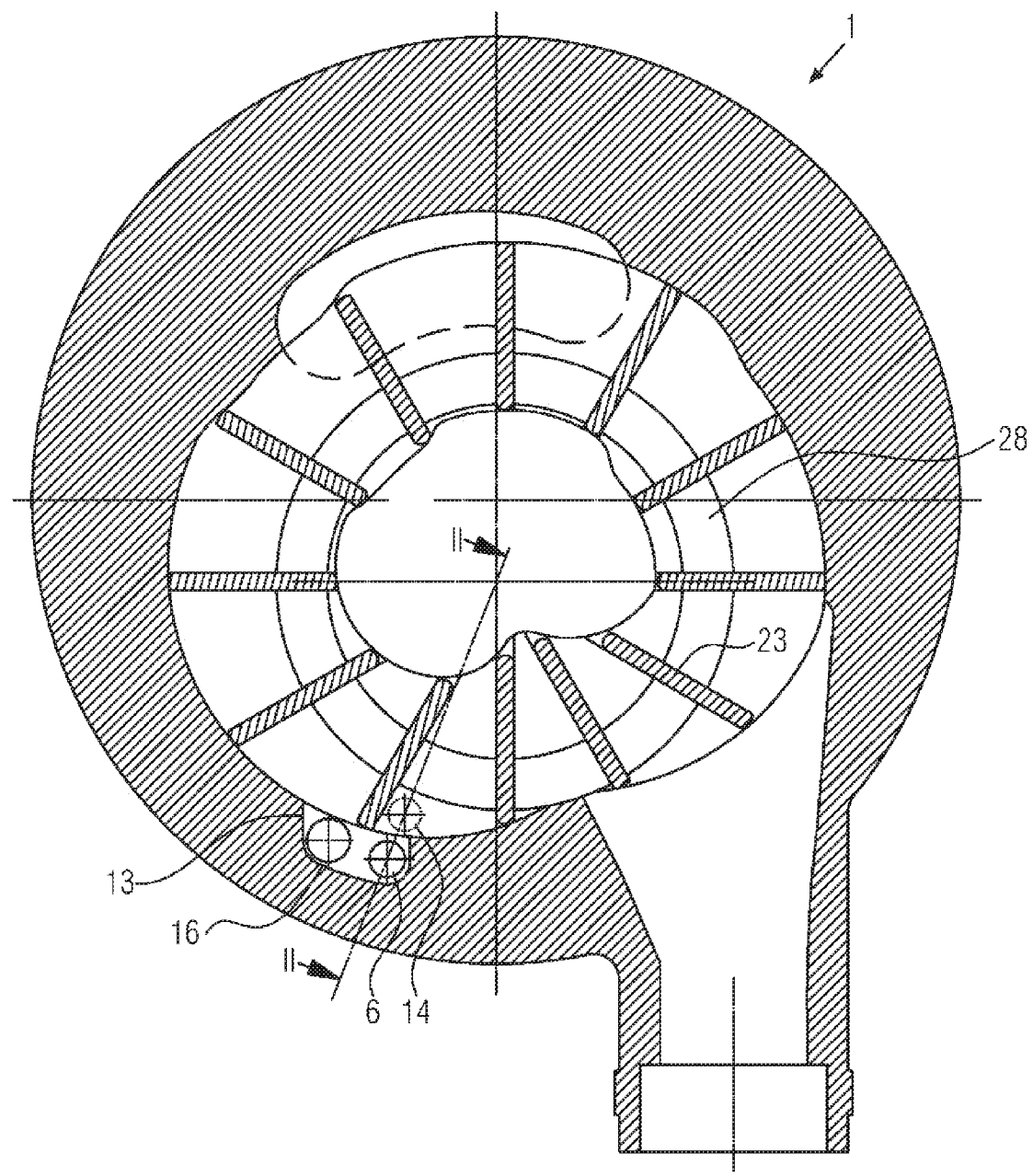
FIG. 8 shows a cross section through a vane cell pump according to the present invention.
Figure 9:
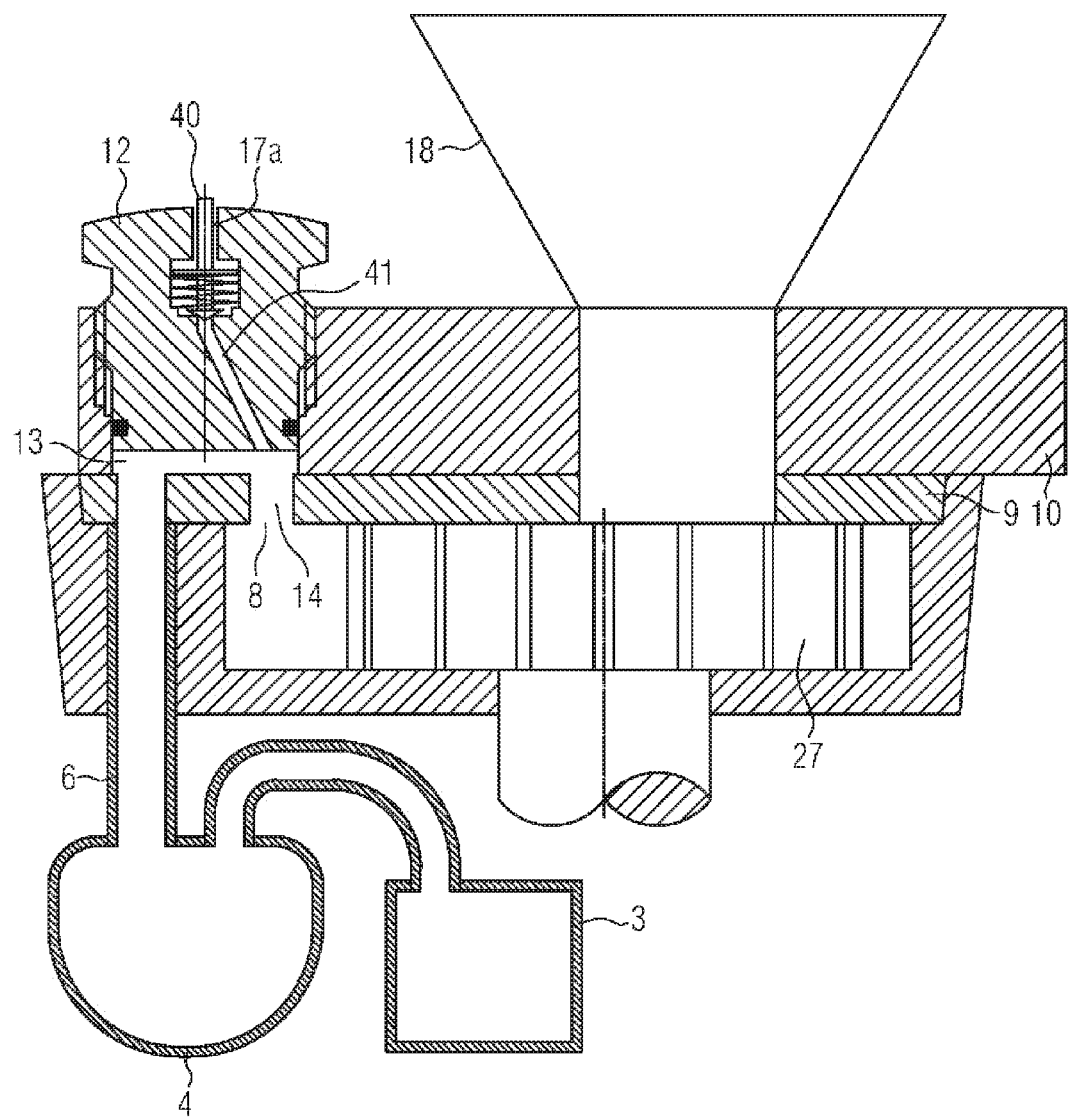
FIG. 9 shows a sectional view along the line I-I in FIG. 8.

FIG. 8 shows a cross-sectional view through an embodiment according to the present invention. FIG. 9 corresponds to a sectional view taken along line II in FIG. 8 This embodiment corresponds substantially to the previous embodiments, where a slide 40 adjustable in height is provided in closure element 12 as a pressure sensor. Slide 40 is used for visual monitoring of pressure conditions.

This slide changes its vertical position in dependence on the pressure in the vacuum region, i.e. in the suction region of the conveying mechanism and in channel 6.

Slide 40 is by a preloaded spring held in a specific position (in which the vacuum region is not closed, i.e. channel 41 is in communication with the exterior atmosphere). Sensor 17a is via a line 41 connected to the vacuum system. With negative pressure, slide 40 is drawn into the closure element and is flush with the latter's surface, i.e. closes the vacuum region. When the vacuum being set is reached, then channel 41 is closed. When the pressure increases, the slide is pushed upwardly, similar to the pressure gauge in a pressure cooker, and protrudes upwardly from closure element 12. When the pressure drops, then the slide, possibly marked in e.g. red, exits from the closure element.

The preceding embodiments in connection with FIGS. 5 through 12 have been described with an axially adjustable piston as a closure element. However, it is also possible to close the inspection opening only with an inspection glass. This allows inspecting the channel and/or the collection container during the process or even channel section 14 which leads to evacuation opening 8.

In the method according to the invention, the pasty mass is by vane cell pump 2 pushed out from hopper 1 into stuffing tube 19. A vacuum can there already be generated in the hopper Negative pressure in the vane cells 7 is in the vane cell pump generated in the vacuum region, i.e. between a sealed region (see FIG. 11 and FIG. 12) and inlet 29. For this purpose, vacuum pump 3 sucks in air via a vacuum line such as 14, 13, 6, 4, 34, 35, through evacuation opening 8 which is located in cover 9. The pressure in the vane cells is ideally to be located within a range from 0.-0.100 mbar. The pressure can there be detected, for example, by sensors 17a, 17b. Excessive pressure can be an indication that cleaning is necessary. The operator can alternatively or additionally via inspection opening 5, as previously explained, recognize in a simple manner whether cleaning is necessary, and in particular sufficiently in advance, such that no uncontrolled pressure increase arises. Cleaning channel 6 or channel section 14 or the evacuation opening, respectively, can take place through opened inspection opening 5 without there being a need to open cover 5 of the filling machine, i.e. without there being a need to empty the hopper.

FIG. 13 is a flow chart of an example method 1300 according to the present invention for filling a pasty mass with a filling machine. Method 1300 includes, at step 1302, conveying a pasty mass with a vane cell pump. Then, at step 1304 a negative pressure in vane cells of said vane cell pump is generated with a vacuum pump. At step 1306, said vane cells are evacuated via an evacuation opening in a cover of a housing of said vane cell pump.

The invention claimed is:

1. A filling machine for filling a pasty mass for the production of sausages, comprising:
   a vane cell pump for conveying said pasty mass,
   a vacuum pump for generating negative pressure in the vane cells of said vane cell pump,
   where a housing of said vane cell pump comprises an evacuation opening via which said vacuum pump evacuates said vane cells, and
where said evacuation opening is formed in a cover of said vane cell pump.

2. The filling machine according to claim 1, wherein said evacuation opening is via a vacuum line in communication with said vacuum pump.

3. The filling machine according to claim 2, wherein said vacuum line comprises a channel section in said cover and a recess formed in said cover and/or in a pivot housing on which said the cover is mounted, where an inspection opening is arranged in an upper region of said recess through which said evacuation opening and/or said channel section being in communication with said evacuation opening is inspectable.

4. The filling machine according to claim 3, wherein a vacuum channel is sealed in a region between said cover and said pivot housing.

5. The filling machine according to claim 3, wherein said vacuum line comprises a channel which is with one end in communication with a collection container for a pasty mass that is dragged along and with its other end opens into a lower region of said recess.

6. The filling machine according to claim 5, wherein said channel and/or said collection container is inspectable through said inspection opening while said cover is closed.

7. The filling machine according to claim 4, wherein said inspection opening is closeable with a closure element, said closure element an axially movable piston and/or said closure element comprising an inspection glass.

8. The filling machine according to claim 7, wherein said axially movable piston is axially movable in said recess and in a lower position separates said channel from said channel section.

9. The filling machine according to claim 8, wherein said axially movable piston is removable from said recess.

10. The filling machine according to claim 8, wherein said axially movable piston is movable so far upwardly that said channel and said channel section are vented.

11. The filling machine according to claim 7, wherein a sensor is integrated into said closure element and/or into said cover of said vane cell pump for measuring the temperature and/or pressure, or said sensor is an optical sensor which optically detects said channel and/or said collection container and/or said channel section and/or said evacuation opening and illustrates this on a display.

12. The filling machine according to claim 11, wherein said sensor is a pressure sensor which comprises a display element which is movable in dependence of the pressure in said vane chambers.

13. The filling machine according to claim 12, wherein said display element includes a slide adjustable in height, and wherein said display element is disposed in an upper region of a channel in said closure element and is by a spring held in a predetermined vertical position, where said display element can with decreasing pressure in said vane cell chambers move downwardly against the spring force.

14. The filling machine according to claim 1, wherein a driven closure cylinder separates a vacuum connection between said vacuum pump and said vane cell pump.

15. The filling machine according to claim 1, wherein a groove-shaped depression in a vacuum region is formed in a flat surface of said cover facing the vane cell pump interior and said evacuation opening is disposed outside said depression in said vacuum region.

16. A method for filling a pasty mass with a filling machine, comprising:
   conveying said pasty mass with a vane cell pump, generating a negative pressure in vane cells of said vane cell pump with a vacuum pump, and evacuating said vane cells via an evacuation opening in a cover of a housing of said vane cell pump.

* * * * *